(12) United States Patent
Edwards

(10) Patent No.: US 6,938,342 B1
(45) Date of Patent: Sep. 6, 2005

(54) METHOD FOR REDUCING SEIZURE IN A CAGELESS BALL BEARING WHICH IS EXPOSED TO FOREIGN PARTICLES

(76) Inventor: Kevin C. Edwards, 19211 Nashville St., Northridge, CA (US) 91326

( * ) Notice: Subject to any disclaimer, the term of this patent is extended or adjusted under 35 U.S.C. 154(b) by 323 days.

(21) Appl. No.: 10/118,442

(22) Filed: Apr. 6, 2002

Related U.S. Application Data

(63) Continuation-in-part of application No. 09/615,614, filed on Jul. 14, 2000, now Pat. No. 6,367,978.

(51) Int. Cl.[7] .................................................. B21K 1/02
(52) U.S. Cl. ................ 29/898; 29/898.042; 29/898.062
(58) Field of Search .............................. 29/898, 898.04, 29/898.041, 898.042, 898.043, 898.06, 898.061, 898.062, 898.064, 898.07, 401.1; 384/445, 450, 451, 456, 490, 491, 507, 508, 621, 627

(56) References Cited

U.S. PATENT DOCUMENTS

| | | | | | |
|---|---|---|---|---|---|
| 1,071,317 A | * | 8/1913 | Hoffmann | ............... | 29/898.062 |
| 2,633,627 A | * | 4/1953 | Olmstead | ............... | 29/898.062 |
| 2,885,767 A | * | 5/1959 | Barish | ............... | 29/898.062 |
| 3,259,962 A | * | 7/1966 | Taylor | ............... | 29/898.062 |
| 3,765,071 A | * | 10/1973 | Bowen | ............... | 29/898.062 |
| 4,390,163 A | * | 6/1983 | Merry | ............... | 254/412 |
| 5,086,560 A | * | 2/1992 | Glazier | ............... | 29/898.061 |
| 5,234,272 A | * | 8/1993 | Shimada | ............... | 384/564 |
| 5,688,177 A | * | 11/1997 | Lindner | ............... | 464/68 |
| 6,367,978 B1 | * | 4/2002 | Edwards | ............... | 384/490 |
| 6,615,968 B2 | * | 9/2003 | Takatsu | ............... | 192/84.961 |

FOREIGN PATENT DOCUMENTS

JP  5-104361 A  *  4/1993  ........... B23P/21/00

* cited by examiner

Primary Examiner—Essama Omgba
(74) Attorney, Agent, or Firm—Ted Masters

(57) ABSTRACT

A method for reducing seizure when a cageless ball bearing is placed in a hostile environment where foreign particles can enter the bearing, comprises removing at least one ball from a full complement of balls. In so doing, a larger circumferential gap between balls is created, thereby making it more difficult for foreign particles to become lodged between balls and seize the ball bearing.

2 Claims, 3 Drawing Sheets

METHOD FOR REDUCING SEIZURE IN A CAGELESS BALL BEARING WHICH IS EXPOSED TO FOREIGN PARTICLES

CROSS REFERENCE TO RELATED APPLICATION

This is a Continuation In Part of Application Ser. No. 09/615,614 filed Jul. 14, 2000, now U.S. Pat. No. 6,367,978, which is included herein by reference.

TECHNICAL FIELD

The present invention pertains generally to ball bearings, and in particular to a method of using an improved cageless ball bearing which is both resistant to foreign particle-induced seizing, and is self cleaning.

BACKGROUND OF THE INVENTION

Rolling-contact bearings are composed of a rolling element interposed between an inner and outer race. In a cageless ball bearing a number of balls rotate freely between inner and outer circular races, thereby permitting the races to independently rotate with respect to each other. The races are grooved to captively accept the balls. The balls are disposed between the races so that the space between the races is substantially circumferentially filled with balls. In another type of ball bearing, separators, sometimes called cages or retainers, are used to evenly space the balls from each other around the race circumference.

Various ball bearing designs are well known in the art. For example, U.S. Pat. No. 3,425,759 shows a gyromotor bearing in which a plurality of sintered polyamide resin, lubricant-impregnated balls are intercalated between the solid steel balls of the bearing.

U.S. Pat. No. 4,500,144 defines a bearing member which includes a series of carbon separators. As the separators wear, the space between the balls increases as is shown in FIG. 13. Notice that the radial angle between balls 14" and 14 is about 80 degrees.

U.S. Pat. No. 5,234,272 pertains to a plurality of rollers 4 are arranged between the inner and outer races 2 and 3 so that the distances between the rollers can be freely changed without a retainer. Since there is no retainer, any abrasion of the retainer due to the frictions between the rollers and the retainer is not caused, the number of the rollers can be increased, and the carrying capacity can be increased so that the roller bearing with a longer life time can be obtained. In one embodiment one or more rollers are removed to reduce friction and prolong the life of the bearing.

U.S. Pat. No. 5,309,529 discloses a bearing arrangement for a radial bearing in an acceleration-proof gyroscope.

U.S. Pat. No. 5,443,317 comprises a rolling bearing having balls of different diameters. The balls have limited movement within a pocket.

French Pat. No. 484,410 is directed to a ball bearing which has alternating large and small balls. The ball bearing has one ball less than a full complement.

A cageless ball bearing is defined as a ball bearing which does not include any form of cage, retainer, or separator to hold the balls apart, but rather a ball bearing in which the balls are free to travel between the inner and outer races in abutting relationship. In a conventional cageless ball bearing, the bearing has a "full complement" of balls. A full complement of balls is defined as the maximum number of balls that will circumferentially fit between the inner and outer races. That is, there is not enough room in which to circumferentially fit another ball. There is however a very small circumferential gap between balls so that the balls are free to move circumferentially around the races, and are also free to rotate within the races. The total circumferential gap between all balls (also defined herein as the "maximum circumferential gap") is less than the diameter of one ball, and typically accounts for only about a ten degree or less open sector. This is desirable because by having the balls tightly packed and therefore evenly distributed around the circumference of the races, the axial forces exerted upon the bearing are always balanced, thereby resulting in smooth vibration-free performance.

However, because the balls of the conventional cageless ball bearing are tightly packed around the circumference of the bearing, the conventional cageless ball bearing is highly susceptible to seizing or binding when foreign particles such as sand, rock, chips, debris, and the like are encountered. Particles can wedge into and completely fill the small circumferential gaps between adjacent balls and prevent the balls from both moving circumferentially around the races, and from rotating within the races. When this happens the bearing seizes, usually rendering the parent machine inoperable.

It is toward the solution of this seizing problem to which the teachings of the present invention are directed.

SUMMARY OF THE INVENTION

The present invention is directed to a method of using an improved ball bearing of the cageless variety which avoids the previously mentioned seizure problems of conventional cageless ball bearing, when the ball bearing is open and exposed to foreign particles. The present invention purposefully abandons the traditional concept of "balancing" the bearing with a full complement of balls, and in so doing achieves the "unexpected result" of dramatically improving performance in a hostile foreign particle environment. In the present invention at least one ball is intentionally removed from a full complement of balls, so that when the remaining balls are placed in abutting relationship, a large maximum circumferential gap exists. By having at least one ball less than a full complement of balls, the average gap between balls is larger therefore it takes more and larger particles to seize the ball bearing. This means that the ball bearing of the present invention will seize much less frequently. Also, because the total gap is larger, the balls develop greater relative motion with respect to adjacent balls. This dynamic property makes it move difficult for foreign particles to wedge between balls.

The present invention not only mitigates against the effect of foreign particles, but is also self cleaning by effectively purging the foreign particles from the bearing. The present invention has been found extremely useful in swimming pool cleaning devices, where in certain instances the ball bearings can be exposed to large amounts of sand and debris which often results in bearing seizure. By using the design of the present however, the bearings were found not to seize when exposed to substantial amounts of sand and debris. It may be appreciated that while the swimming pool application is useful, the principles of the present invention could also be practiced in any environment where foreign particles are existent and free to enter the bearing, such as in a windy desert setting.

In accordance with a preferred embodiment of the invention, a method of reducing seizure in a cageless ball bearing includes providing cageless ball bearing which has at least one ball less than a full complement of balls. That is, the number of balls is at least one less than a maximum number of balls that will circumferentially fit in the circular ring-shaped space between the inner and outer races.

In accordance with an important aspect of the invention, the cageless ball bearing includes a maximum circumferential gap which subtends an angle of between about 15° and about 90°.

In accordance with an important feature of the invention, the angle is between about 40° and about 60°.

In accordance with another important aspect of the invention, the method is solely targeted at reducing bail bearing seizure, and not at reducing conventional bearing friction or prolonging bearing life.

Other features and advantages of the present invention will become apparent from the following detailed description, taken in conjunction with the accompanying drawings, which illustrate, by way of example, the principles of the invention.

DETAILED DESCRIPTION OF THE INVENTION

Figure 1:
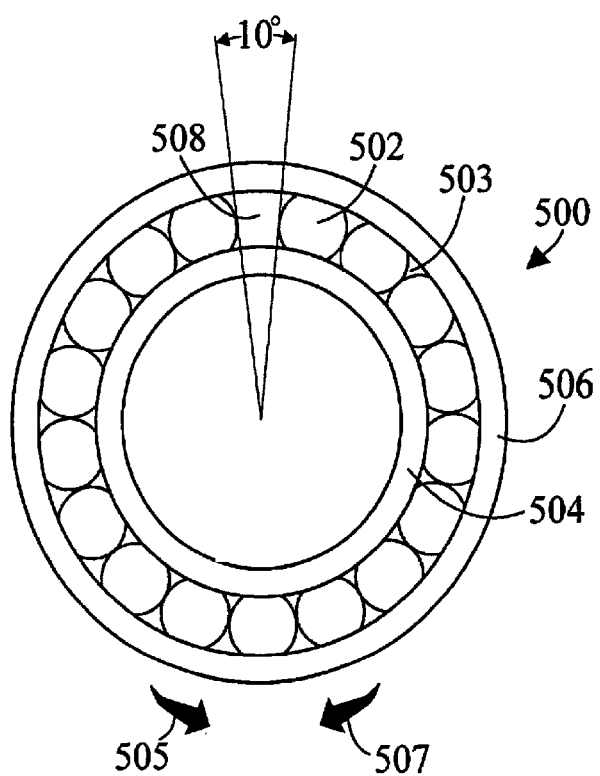
FIG. 1 is a top plan view of a prior art ball bearing having a "full complement" of balls.

Referring initially to FIG. 1, there is illustrated a top plan view of a prior art cageless ball bearing having a "full complement" of balls, generally designated as 500. A plurality of balls 502 are captively disposed in circular space 503 between inner 504 and outer 506 races. When placed in the shown abutting relationship, the number of balls 502 (17 in the shown example) almost circumferentially fills the space between races 504 and 506. This is defined as a full complement of balls since another ball 502 would not fit between the races. A small clearance gap 508 (maximum circumferential gap) subtends an angle of about 10° or less. Outer race 506 is free to rotate in either direction 505 or 507 with respect to inner race 504.

Figure 2:
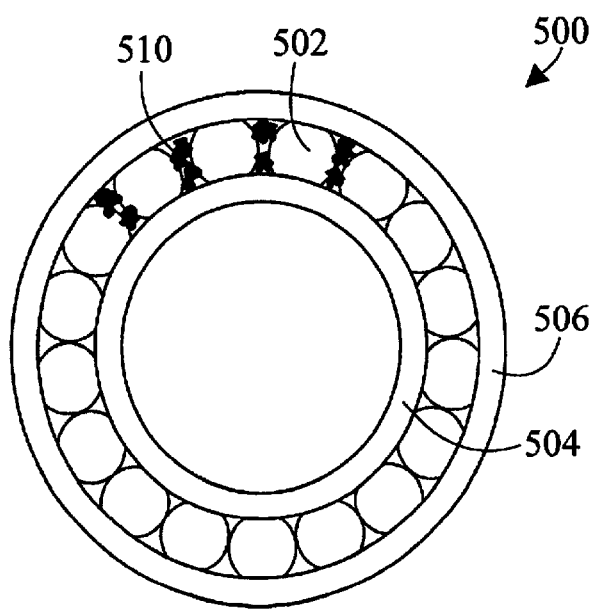
FIG. 2 is a top plan view of the prior art full complement ball bearing shown seizing when exposed to foreign particles.

Referring now to FIG. 2, there is illustrated a top plan view of the full complement ball bearing 500 shown seizing when exposed to foreign particles 510. Since gap 508 is relatively small, there is little room for balls 502 to move circumferentially before they abut an adjacent ball. Therefore, a small amount of foreign particles 510 can become wedged in the space between balls 502 and seize or bind ball bearing 500. When seized, outer race 506 cannot freely rotate with respect of inner race 504.

Figure 3:
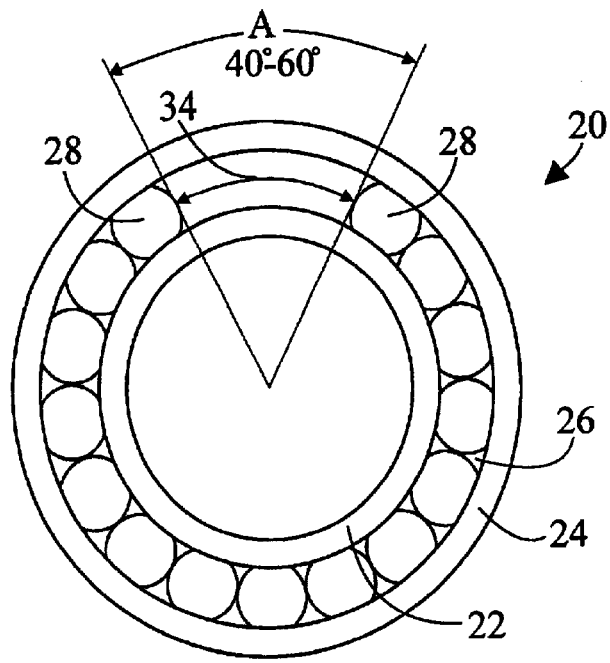
FIG. 3 is a top plan view of ball bearing in accordance with the present invention.

Now referring to FIG. 3, there is illustrated a seize resistant cageless ball bearing in accordance with the present invention, generally designated as 20. Bearing 20 includes an inner race 22, and outer race 24, and a circular space 26 disposed between the inner race 22 and the outer race 24. A plurality of balls 28 (15 in the shown example) are circumferentially and captively disposed in space 26, so that each ball 28 is free to circumferentially abut two adjacent balls 28 (the balls on either side). In FIG. 3, balls 28 have been placed in abutting relationship wherein the balls 28 form a contiguous arc, so that a maximum circumferential gap 34 exists between the edges of the two end balls 28. In the present invention, maximum circumferential gap 34 subtends an angle A of between about 15° and about 90° (refer to FIGS. 5 and 6). In a preferred embodiment, angle A is between about 40° and about 60° (the actual angle shown in FIG. 3 is about 55°). By leaving a maximum circumferential gap 34 which is substantially larger than that of the prior art ball bearing 500 (refer to FIGS. 1 and 2), balls 28 have much greater freedom to move circumferentially until they abut an adjacent ball 28, and thereby avoid the build up of foreign particles. It is noted that in the shown embodiment the number of balls 28 is two less than a maximum number of balls 28 (full complement of balls 28) that will circumferentially fit in space 26. The number of balls 28 that must be removed from the full compliment to achieve the desired gap 34 and angle A will vary depending upon the design and dimensions of the ball bearing 20 and balls 28, however the plurality of balls 28 must be at least one less than a maximum number (full complement) of balls 28 that will circumferentially fit in space 26.

Figure 4:
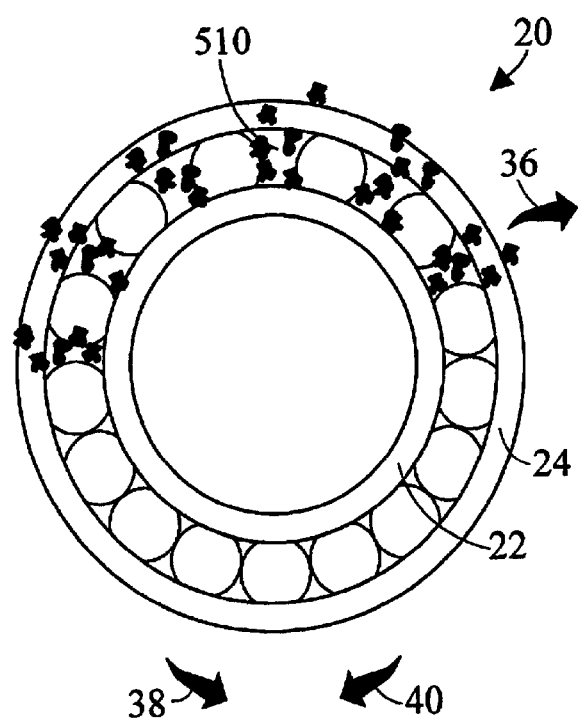
FIG. 4 is a top plan view of the ball bearing of the present invention being exposed to foreign particles.

Now referring to FIG. 4, there is illustrated a top plan view of ball bearing 20 being exposed to foreign particles 510. Because balls 28 have been removed, maximum circumferential gap 34 and angle A are large (refer to FIG. 3), seizing is almost impossible since the large body of particles 510 necessary to cause seizing cannot fill the larger gaps between balls in a dynamic rotating environment. To the contrary, the particles 510 tend to be purged from bearing 20 as is indicated by the outward arrow 36. Bearing 20 therefore exhibits a novel and very useful self cleaning feature. Even in a hostile environment of foreign particles 510, outer race 24 will freely rotate in either directions 38 or 40 with respect to inner race 22.

Figure 5:
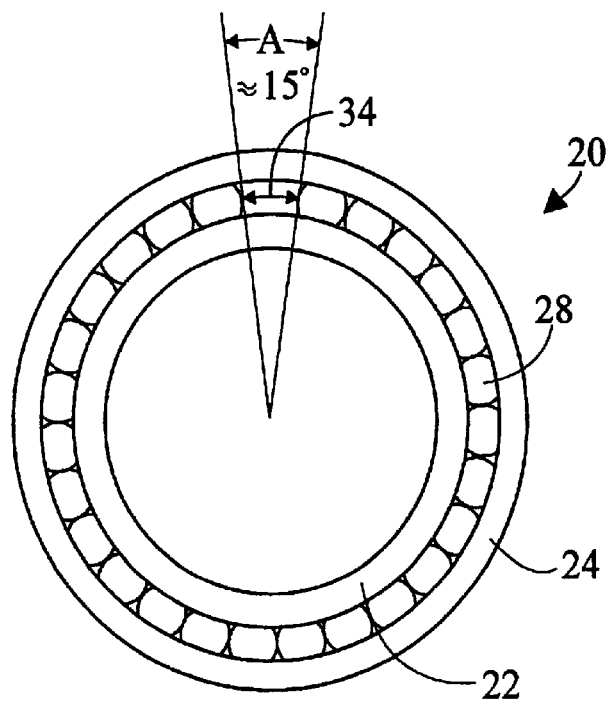
FIG. 5 is a top plan view of a second ball bearing in accordance with the present invention, wherein the angle subtended by the maximum circumferential gap is about 15°; and, FIG. 6 is a top plan view of a third ball bearing in accordance with the present invention, wherein the angle subtended by the maximum circumferential gap is about 90°.

FIG. 5 is a top plan view of a second ball bearing 20 in accordance with the present invention, wherein angle A subtended by maximum circumferential gap 34 is about 15°. In this embodiment, only one ball 28 has been removed from a full complement. A 15° angle is about the smallest angle that can be utilized to practice the principles of the present invention, lest ball bearing 20 fall prey to the same seizure problems as a conventional bearing 500 (refer to FIGS. 1 and 2).

Figure 6:
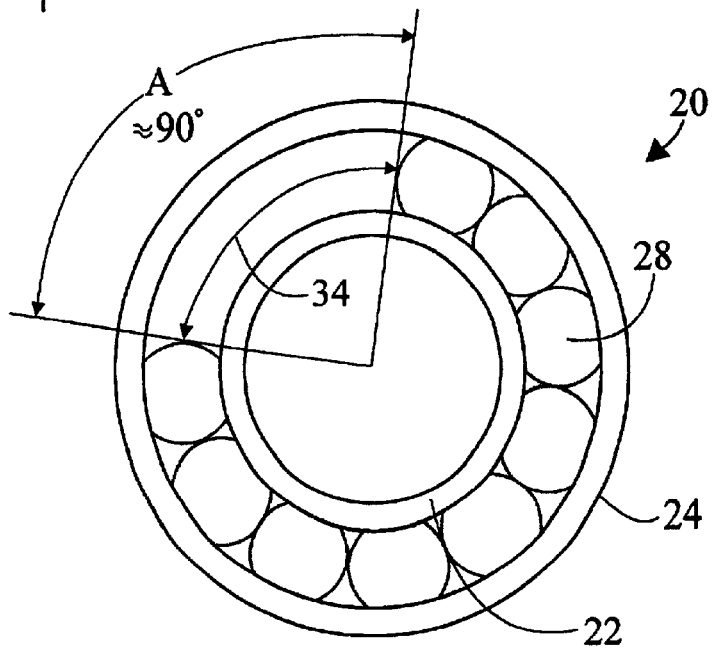

FIG. 6 is a top plan view of a third ball bearing 20 in accordance with the present invention, wherein angle A subtended by maximum circumferential gap 34 is about 90°. In this embodiment, three balls 28 have been removed from a full complement.

In view of the aforementioned description, a method for reducing ball bearing seizure in an environment where foreign particles, can enter the ball bearing, comprises:
 (a) providing an environment having freely moving foreign particles;
 (b) providing a cageless ball bearing having:
  an inner race;
  an outer race;
  a circular space disposed between the inner race and the outer race, the space sufficient to circumferentially hold a maximum number of balls;

a plurality of balls circumferentially disposed in the space;

(c) ensuring that the plurality of balls is at least one less than the maximum number of balls; and, (d) placing the cageless ball bearing in operation in the environment, wherein the foreign particles can enter the space.

The method further includes:

(e) observing that the foreign particles cause the ball bearing to seize less frequently than does a ball bearing having the maximum number of balls.

The method further includes:

(e) observing that as the ball bearing operates, foreign particles are purged from the space.

The method further includes:

in step (b), the plurality of balls defining a maximum circumferential gap which subtends an angle of between about 15° and about 90°, and in a preferred embodiment between about 40° and 60°.

The method further includes:

in step (a), the environment being one of a swimming pool, and a windy particle-filled locale.

An alternative method for reducing ball bearing seizure in an environment where foreign particles, can enter the ball bearing, comprises:

(a) providing an environment having freely moving foreign particles;

(b) providing a cageless ball bearing having:
an inner race;
an outer race;
a circular space disposed between the inner race and the outer race, the space sufficient to circumferentially hold a maximum number of balls;
a full complement of balls circumferentially disposed in the space;

(c) removing at least one ball from the full complement of balls thereby defining a maximum circumferential gap; and, (d) placing the cageless ball bearing in operation in the environment, wherein the foreign particles can enter the space.

The preferred embodiments of the invention described herein are exemplary and numerous modifications, dimensional variations, and rearrangements can be readily envisioned to achieve an equivalent result, all of which are intended to be embraced within the scope of the appended claims.

I claim:

1. A method for reducing ball bearing seizure in an environment where foreign particles can enter a ball bearing, comprising:

(a) providing a cageless ball bearing having:
an inner race;
an outer race;
a circular space disposed between said inner race and said outer race, said space sufficient to circumferentially fit a predetermined maximum number of balls;
a plurality of balls circumferentially disposed in said space;

(b) ensuring that said plurality of balls is at least one less than said predetermined maximum number of balls;

(c) placing said cageless ball bearing in operation in said environment, wherein said foreign particles can enter said space; and, in step (a), said plurality of balls defining a maximum circumferential gap which subtends an angle of between about 15° and about 90°.

2. A method for reducing ball bearing seizure in an environment where foreign particles can enter a ball bearing, comprising:

(a) providing a cageless ball bearing having:
an inner race;
an outer race;
a circular space disposed between said inner race and said outer race, said space sufficient to circumferentially fit a predetermined maximum number of balls;
a full complement of balls circumferentially disposed in said space;

(b) removing at least one ball from said full complement of balls thereby defining a maximum circumferential gap;

(c) placing said cageless ball bearing in operation in said environment, wherein said foreign particles can enter said space; and, in step (b), said maximum circumferential gap subtending an angle of between about 15° and about 90°.

* * * * *